3,275,624
ESTRA-1,3,5(10)-TRIENES HAVING
SOLUBILIZING GROUPS
Edward Warren Cantrall and Seymour Bernstein, both of
New City, N.Y., assignors to American Cyanamid Company, Stamford, Conn., a corporation of Maine
No Drawing. Filed Sept. 16, 1965, Ser. No. 487,913
4 Claims. (Cl. 260—239.55)

This invention relates to new steroid compounds. More particularly, it relates to estra-1,3,5(10)-trienes having solubilizing groups in the $C_3$ and $C_{17}$ positions.

It is well known that most steroids are substantially insoluble in aqueous or substantially aqueous solutions. The preparation of aqueous steroid solutions is therefore difficult if not impossible under most conditions.

We have found that steroids of the following structures are soluble in aqueous solutions.

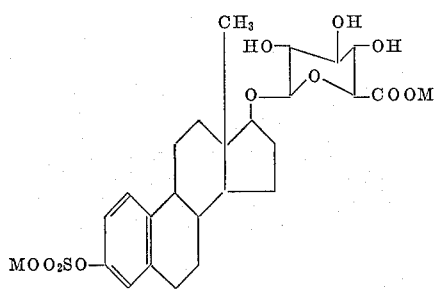

wherein M is selected from the group consisting of sodium, potassium and ammonium.

The compounds of the present invention are substantially water soluble. They are crystalline solids having a relatively high melting point.

The starting material for the present compounds is methyl (3-hydroxyestra-1,3,5(10)-trien-17β-yl-2,3,4-tri-O-acetyl-β-D-glucoside) uronate which has been described by H. H. Wotiz et al., J. Am. Chem. Soc., 81, 1704 (1959). The latter compound is reacted with sulfamic acid and subsequently with a salt such as potassium hydroxide, sodium hydroxide, ammonium hydroxide and the like to produce the di-salt of the estra-1,3,5(10)-triene-sulfate-glucosiduronic acid.

This invention provides a method of preparing water soluble derivatives of steroids such as estradiol. The novelty primarily resides in the incorporation of two different solubilizing groups on the same steroid moiety, each of which is labile at different pH values, thereby giving water solubility over a wider range of pH value than can be realized with either group alone.

The present compounds are useful orally and parenterally in replacement therapy in estrogen deficiency such as exists in the menopausal syndrome. They may be administered parenterally to induce ovulation or used topically in the treatment of skin conditions arising from hormonal imbalance.

The following examples illustrate in detail the preparation of representative estra-1,3,5(10)-trienes of the present invention.

EXAMPLE 1

3-sulfooxy - estra - 1,3,5(10) - trien - 17β - yl - β-D-glucosiduronic acid, di-potassium salt A mixture composed of 10.0 g. of methyl (3-hydroxy-estra-1,3,5(10) - trien - 17β - yl - 2,3,4 - tri-O-acetyl-β-D-glucoside) uronate, 4.92 g. of sulfamic acid and 50 ml. of pyridine is heated and stirred on a steam bath for 1½ hours. The mixture is cooled to room temperature and poured into 200 ml. of ether. The resulting slurry is stirred for 5 minutes, let stand for 5 minutes and filtered. The precipitate is leached with 200 ml. of methylene chloride and the filtrate is evaporated to a foam under reduced pressure at 45°–50° C. The latter is dissolved in 500 ml. of methanol and treated with 80 ml. of a 12% potassium hydroxide in methanol solution with stirring for 1 hour at room temperature. The resulting slurry is poured into 2 liters of ether, stirred for 5 minutes, let stand for 5 minutes and filtered. The product is dried under reduced pressure at room temperature to give 9.45 g. (92%), melting point, darkens and sinters at 245°–255° C. A specimen for microanalysis is recrystallized several times from cold concentrated ammonium hydroxide and has melting point 271° C., with decomposition and previous darkening; $[\alpha]_D$ $-17°$ ($H_2O$).

EXAMPLE 2

3-sulfooxy - estra - 1,3,5(10) - trien - 17β - yl - β-D-glucosiduronic acid, di-sodium salt Following the procedure of Example 1 and substituting sodium hydroxide in place of potassium hydroxide gives the product described above.

EXAMPLE 3

3-sulfooxy - estra - 1,3,5(10) - trien - 17β - yl - β-D-glucosiduronic acid, di-ammonium salt When the procedure of Example 1 is followed and ammonium hydroxide is substituted for potassium hydroxide the di-ammonium salt described above is obtained.

We claim:
1. A steroid of the formula:

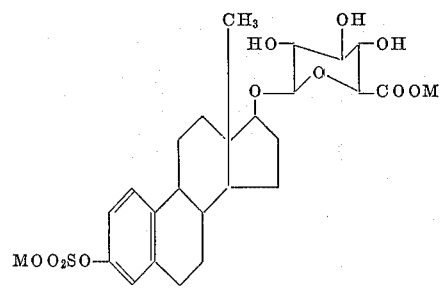

wherein M is selected from the group consisting of sodium, potassium and ammonium.

2. The compound 3 - sulfooxy - estra - 1,3,5(10)-trien-17β-yl-β-D-glucosiduronic acid, di-potassium salt.

3. The compound 3 - sulfooxy - estra - 1,3,5(10)-trien-17β-yl-β-D-glucosiduronic acid, di-sodium salt.

4. The compound 3 - sulfooxy - estra - 1,3,5(10)-trien-17β-yl-β-D-glucosiduronic acid, di-ammonium salt.

References Cited by the Examiner
UNITED STATES PATENTS

| | | | |
|---|---|---|---|
| 2,642,427 | 6/1953 | Hasbrouck | 260—239.5 |
| 3,206,359 | 9/1965 | Sarett et al. | 167—58 |

OTHER REFERENCES

Gilbert et al.: Ind. and Eng. Chem., 43, pages 2022–2052 (1951), pages 2045 and 2046 relied on.

Jayle et al.: Bull. Soc. Chim. Biol., 41, pages 1593–1603 (1959).

Sheps et al.: Journ. Biol. Chem., 235, pages 3042–3048 (1960).

LEWIS GOTTS, Primary Examiner.

THOMAS M. MESHBESHER, Assistant Examiner.